No. 875,192. PATENTED DEC. 31, 1907.
J. G. LEYNER.
FLUID CONTROLLED CLUTCH.
APPLICATION FILED MAR. 26, 1907.
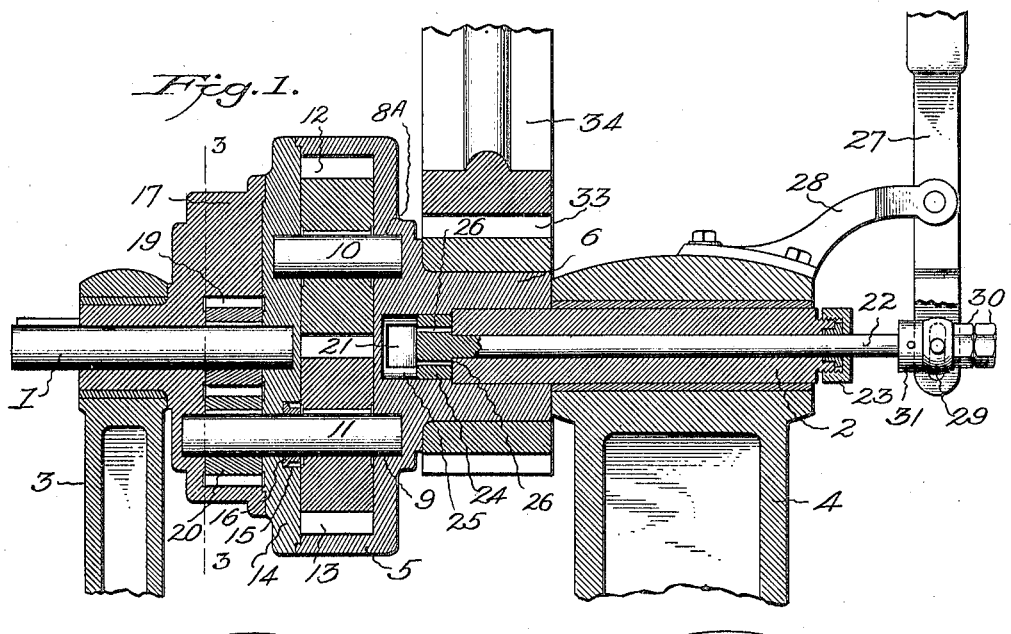
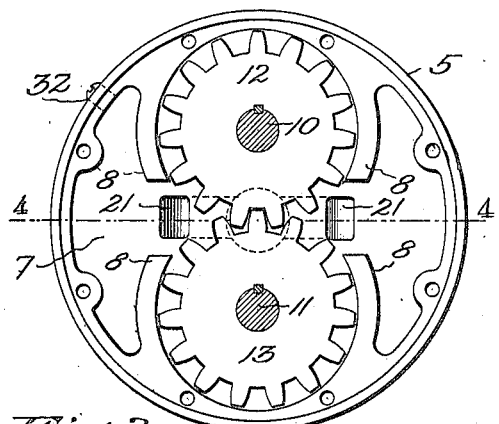
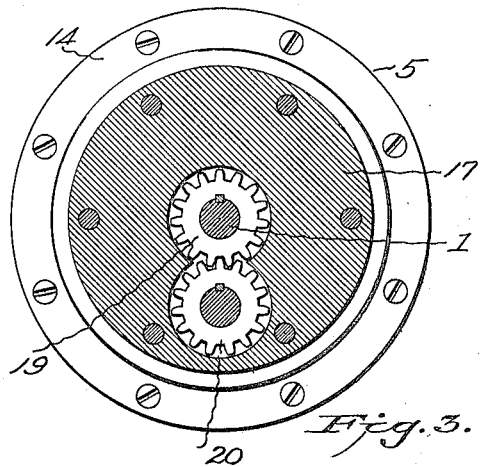
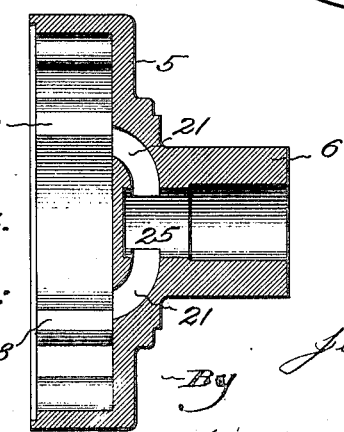
Witnesses:
G. Sargent Elliott
Adella M. Fowle
Inventor:
John George Leyner
By
H. S. Bailey. Attorney.

UNITED STATES PATENT OFFICE.

JOHN GEORGE LEYNER, OF DENVER, COLORADO.

FLUID-CONTROLLED CLUTCH.

No. 875,192.    Specification of Letters Patent.    Patented Dec. 31, 1907.

Application filed March 26, 1907. Serial No. 364,659.

*To all whom it may concern:*

Be it known that I, JOHN GEORGE LEYNER, a citizen of the United States of America, residing at the city and county of Denver and State of Colorado, have invented a new and useful Fluid-Controlled Clutch, of which the following is a specification.

My invention relates to a new speed accelerating starting clutch for gradually applying power to machinery for moving loads; and the objects of my invention are: First, to provide a fluid operating slow-speed starting and speed accelerating fluid controlled clutch adapted to gradually start and progressively increase the speed of load lifting and load moving engines. Second, to provide a clutch adapted to connect constant speed electric motors to dead load starting and moving or lifting hoisting traction transmission machines. And third, to provide a fluid controlled clutch that is simple, practical, reliable, and that is especially designed for use with constant speed electric motor operated hoisting engines for mining and other uses. I attain these objects by the mechanism illustrated in the accompanying drawings, in which:

Figure 1, is a sectional elevation of my improved fluid controlled clutch. Fig. 2, is a front elevation of the clutch casing, the cap or cover being removed. Fig. 3, is a transverse section on line 3—3 of Fig. 1. And Fig. 4, is a horizontal, sectional view of the clutch casing, on the line 4—4 of Fig. 2.
Similar letters of reference refer to similar parts throughout the several views.

Referring to the drawings, the numeral 1, designates the clutch or driver shaft of a constant speed electric motor; and 2 designates the driven shaft. The driver shaft 1 and the driven shaft 2, are rotatably journaled in bearings 3 and 4 respectively, that form a part of the supporting frame of the machine to which the clutch is attached. These two shafts and their bearings are arranged in axial alinement but with their adjacent ends positioned at a short distance apart.

To the end of the driven shaft 2, I secure the clutch case 5, which consists of a circular disk-shaped casting provided with a hub 6, that is keyed or otherwise secured to the end of the driven shaft 2. The disk portion of this clutch case is provided with an axial chamber 7, in the diametrically opposite sides of which curved partitions 8 are formed, that extend from the inner wall of the chamber towards the axial center of the chamber. These curved walls form gear housings and they are arranged concentric to journal apertures $8^A$ and 9, which are positioned at a predetermined distance from and on opposite sides of the axial center of the clutch case. In these journal apertures I rotatably mount one end of a pair of shafts 10 and 11, upon which are mounted and secured a pair of gears 12 and 13, the teeth of which intermesh and rotate closely together. The opposite end of the shaft 10 is journaled in a partition 14, that fits against and is secured to the chambered end of the case, with a fluid-tight joint, and thus closes the chamber and incases the gears, the gears being arranged to fit closely and to rotate freely between the partition and the bottom of the chamber. The shaft 11 extends through and beyond this partition, and is journaled in an aperture 15, which is provided with an anti-friction bushing 16.

To the outside of the partition a cap or cover 17 is secured. This cover is provided with a hub portion that is rotatably mounted on the driver shaft. This hub is preferably arranged to extend into the journal bearing 3, of the driver shaft 1, thus acting as a part of the journal bearing support for the driver shaft. The cover is provided with a gear chamber which enters its side adjacent to the partition, and the terminal end of the driver shaft 1 extends through this chamber and is rotatably journaled in a bearing formed in the partition. The shaft 11 extends through the partition and through the chamber in the cover, and its terminal end is journaled in a bearing formed in the cover. A gear 19 is keyed to the driver shaft within the chamber of the cover, and a gear 20 is also keyed to the shaft 11, within the chamber of the cover, and meshes with and is driven by the gear 19.

A port or passage 21 is formed in the body of the casing, which port extends through the body of the casing at right angles to the axial center of the casing and its shaft, and its opposite ends open into the chamber 7 at opposite sides of the gears; consequently it forms a continuous passage or port from one side of the chamber and of the gears to the opposite side of the chamber and the gears. In operating the clutch it is necessary to control this port so that it can be either wholly or partially opened or closed, and while the invention contemplates the use of any valve controlled port connecting the opposite sides of the chamber and the gears, I preferably carry out this feature of my invention in the following manner: I position this port so that it will pass through the plane of the axial center of the case at right angles to the driver and driven shafts of the clutch, and so that at one point it will pass through the body of the case at its axial center, and of the axial center of the driven shaft 2, and I place a valve at this point, preferably arranging it in the following manner: Through the axial center of the driven shaft 2, I slidably extend a valve stem 22, which extends beyond the outer end of this shaft. A stuffing box 23 surrounds the valve stem, and is threaded or otherwise connected to the outer end of the shaft 2, and is properly packed to prevent leakage between the valve stem and its bearing in the shaft.

Upon the inner end of the valve stem I secure or form a valve 24, preferably making it integral with the valve stem. This valve consists of a disk, which is seated in a circular port 25, which is formed in the axial center of the body of the case, and across the main port, thus intersecting it as well as being positioned partially at one side of it. The valve stands normally at one side of the main port. This valve is provided with apertures 26, which extend through it and are adapted to form passages for any fluid that may flow past the valve to its rear side. The outside end of the valve stem is provided with a hand lever 27, which is operatively supported by a bracket 28, adjacent to its lower end, and below this point it is forked, and the forked members are slotted to receive pins which project from a collar 29, which is retained by nuts 30 and a collar 31 to the valve stem. The chamber 7 in the clutch casing is filled with suitable fluid, preferably oil, through a plugged aperture 32, and the oil is pumped and forced through the chamber and the port by the teeth of the gears in a continuous stream from one side of the chamber and the gears through the port to the opposite side of the gears and chamber. The hub of the casing is provided with either a pulley or a pinion, but I illustrate a pinion 33 which is shown in mesh with a fragment of a gear wheel 34.

The operation of my fluid controlled gradual speed accelerating clutch is as follows: The driver shaft 1 is operatively connected to any suitable constant speed motor, which I do not illustrate, but which it is assumed is running steadily at its regular rate of speed, while the driven shaft 2 and the valve casing are also connected by either a pinion or a pulley to the load lifting or moving machine, which I do not illustrate. The driver shaft with its gears and the body of oil is kept running continuously by the constant speed motor, while the casing of the clutch and the load raising or moving machine is normally stationary, and when it is desired to start the load raising or lifting machine to raise or move its load, the valve stem is manually operated by the motorman or engineer through the medium of the lever 27 to close the port, which instantly stops the free continuous normal flow of the oil through the chamber, the gears, and the port; the gears however continue to pump the oil from one side of the chamber into the port, and as it cannot pass through the port to the opposite side of the gears and of the chamber, it is compressed, instantly in a continuous and progressive degree, until it exerts a back pressure on the gears that slows them down, and at the same time a rotary pushing movement on the clutch casing that in a few seconds starts it slowly to rotating, which rotative movement very rapidly increases as the oil is compressed by the pumping effect of the teeth of the gears until the oil is so compressed that it offers a slightly elastic or yielding lock to the rotative movement of the gears, and consequently the driving power of the constant speed motion is transmitted through the driver shaft and the gears within the clutch casing through the solid body of compressed oil to the casing and its pinion or drives the load lifting or moving machine. When the load has been raised or moved as desired, the engineer opens the valve and releases the compressed oil, which releases the gears and they start again rotating, while the casing of the clutch with the load raising or moving machine comes to a stop. The great pressure in the chamber and port causes the oil to leak past the valve slightly into its seat aperture, but the apertures through the valve allow the oil to flow from behind the valve into the port the instant the valve is moved to open the port. The valve can be moved to either open or close the port as slowly as desired, so that the load may be started or stopped as slowly and gradually as the conditions require.

The shaft 2, the body of the casing, the partition, the cover, the gears, and the driver shaft 1, all rotate together in their supporting journal boxes 3 and 4, when the clutch is in full power transmitting operation, being locked together by the compression of the oil when the valve is closed.

My speed accelerating fluid controlled clutch is very simple and thoroughly practical. It is especially adapted for use with electric hoists where constant speed motors are used to drive the hoisting drums, and it is obvious that it can be applied to a great variety of work where dead loads are required to be started and moved at considerable speed and then stopped again.

Having described my invention, what I claim as new and desire to secure by Letters Patent, is:

1. In a fluid controlled clutch, the combination with a revolubly mounted casing, of a gear chamber provided with a supply of any suitable fluid, a pair of intermeshing gears rotatably mounted in said chamber and fluid, a valve controlled port in said casing connected with opposite edges of said gears, and said chamber provided with a manually operated valve, a driver shaft rotatably mounted in said casing, means for driving said shaft, and gearing connecting said driver shaft to said intermeshing gears of said casing's chamber to rotate them.

2. In a fluid controlled load starting clutch, the combination of the casing, a shaft secured to one end of said casing, suitable bearings for said shaft and for the opposite end of said casing, a chamber in said casing, a port in said casing connected to the opposite sides of its axial center, a valve disk seat in said port, a valve seated in said port seat to control said port, a valve stem connected to said valve and slidably mounted in the axial center of said shaft, a lever connected to said valve stem to operate said valve to close or open said port, intermeshing gears in said chamber, a body of any suitable liquid in said chamber, and means independent of said casing, for driving said intermeshing gears.

3. In a fluid controlled starting clutch, the combination of a casing comprising a body portion containing a chamber provided with a supply of oil, a pair of intermeshing gears rotatably mounted in said chamber, a partition secured to said chamber, a cover secured to said partition provided with a chamber, a pair of intermeshing rotating gears in said cover's chamber, a driver shaft connected to one of said cover's gears, a shaft connecting the other cap cover's gear with one of the gears of the chamber of said casing, a port extending through the body of said casing, and connected at its opposite ends with the opposite ends of said chamber in the body of said casing, a valve arranged to control said port, and suitable bearings arranged to rotatably support said combined body portion and cover of said casing.

4. In a fluid controlled load starting clutch the combination of the body portion of the casing, provided with a gear housing chamber, the partition member secured to said body portion to cover said chamber, the cover member secured to said partition member, and also provided with a gear chamber, with the intermeshing gears rotatably arranged to rotate in said chambers, a driver shaft rotatably mounted in said cover and connected to one of its gears, and a shaft extending through both chambers and operatively connecting the gears of each chamber.

5. In a liquid controlled load starting clutch, the combination of the casing, rotatably mounted in suitable bearings, the port extending across the axial center of said casing at one end, the oil and gear chamber arranged to connect to said port and adapted to hold a supply of oil or other suitable fluid, the valve seat at the axial center of said port, the manually operating valve and valve stem arranged at the axial center of said casing to control said port, the intermeshing gears in said oil chamber, the driving shaft rotatably mounted in the opposite end of said casing, and means connected to said driving shaft for rotating the gears in said oil chamber.

6. In a clutch of the character described, a revoluble casing, a pair of intermeshing gears in said casing, one of which is mounted on a shaft which projects beyond the casing, walls partially surrounding said gears and forming chambers on each side of said casing adapted to be filled with a suitable liquid, a port being formed transversely through the wall of said casing, connecting said chambers; a hub on one end of the casing having an axial bore which intersects said port; a hollow shaft extending partially into said bore and supported in a bearing; a reciprocable valve in said bore, having a stem which extends out through said shaft, and means for reciprocating said valve; a gear on the projecting shaft of one of the gears in said casing, a power-driven gear in mesh with said last named gear, and a pinion on the hub of said casing.

In testimony whereof I affix my signature in presence of two witnesses.

JOHN GEORGE LEYNER.

Witnesses.
G. SARGENT ELLIOTT,
ADELLA M. FOWLE.